United States Patent
Johnson

(10) Patent No.: US 6,636,490 B1
(45) Date of Patent: Oct. 21, 2003

(54) SELF-INSTALLATION OF WIRELESS ACCESS NETWORK TERMINALS

(75) Inventor: Philip N Johnson, Paignton (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/352,166

(22) Filed: Jul. 12, 1999

(51) Int. Cl.⁷ .................................................. H04Q 7/00
(52) U.S. Cl. ...................................... 370/328; 455/435
(58) Field of Search ............................. 370/310.2, 312, 370/328, 395.52, 389; 455/3.05, 524, 525

(56) References Cited

U.S. PATENT DOCUMENTS

| | | | |
|---|---|---|---|
| 5,774,461 A | * | 6/1998 | Hyden |
| 5,787,360 A | * | 7/1998 | Johnston |
| 6,125,113 A | * | 9/2000 | Farris |
| 6,131,012 A | * | 10/2000 | Struhsaker |

* cited by examiner

Primary Examiner—Wellington Chin
Assistant Examiner—Kamran Emdadi
(74) Attorney, Agent, or Firm—Barnes & Thornburg

(57) ABSTRACT

Self installation of subscriber terminals in a wireless access network is desirable in order to reduce the costs of rolling-out such a network. However correct configuration of the terminal within a sub-method network by the subscriber cannot be relied upon. The present invention provides a method for installing subscriber terminals in a packet switched wireless access network comprising a plurality of base stations, wherein the terminals network address is dependent on the base station to which said terminal is radio linked, said method comprising the steps of determining a unique identification reference and the installation site for said terminal; pre-loading each of said base stations within the geographical area of said installation site with said reference and a network address for said terminal which is dependent on said base station; receiving a connect message including said reference from said terminal to one of said base stations; transmitting to said terminal the network address dependent on said receiving pre-loaded base station.

7 Claims, 3 Drawing Sheets

| 10 | 3 | 128 | 0 |

*(a)*

| 10 | 4 | 0 | 0 |

*(b)*

| 10 | 3 | 203 | 112 |

*(c)*

| 10 | 3 | 203 | 113 |

SELF-INSTALLATION OF WIRELESS ACCESS NETWORK TERMINALS

FIELD OF THE INVENTION

The present invention relates to the self-installation of subscriber terminals in a packet switched wireless access network.

BACKGROUND TO THE INVENTION

One of the advantages of a wireless network system is the ease of installation owing to the absence of cable laying. It is therefore important that the installation of base stations and customer premises systems is straightforward, rapid, low cost, and error free to preserve this advantage. A significant barrier to the market acceptance of wireless network systems is the complexity and cost of installation perceived by potential subscribers of the system. These disadvantages also affect the profitability of network installation.

Typically wireless networks employ a cellular structure with base stations supporting a few hundred users for example, each of which is connected by a small radio transceiver or subscriber terminal. Packet switched wireless data networks typically use IP protocols in which data is routed around the cells of the network to and from nodes such as computers and digital phones in subscribers' premises using IP routing. In large systems of inter-connected packet switched networks such as the Internet for example, access networks such as fixed wireless access (FWA) networks are sub-netted such that each cell in which each base station is radio linked to a plurality of subscriber terminals is designated a sub-net of the FWA network. Similarly the IP nodes attached to a subscriber's terminal are designated a sub-net of the "cell" sub-net. Sub-netting is well known in the art and provides for adequate routing times. The particular version of sub-netting which is required is that defined in RFC 1519—Classless Inter-Domain Routing. This use of sub-netting however implies that each subscriber terminal and node unique Internet address will be dependent on the particular base station used within the FWA network.

Currently access terminal installation at a subscriber's premises requires the use of a specialist technician to select a particular base station in the subscriber's general geographical area using a radio survey, and then collaborate with the network operator to determine a unique Internet address for each subscriber node within the range allocated to the selected base station. This is both inconvenient to the user and represents a considerable cost in the roll-out of a packet switched wireless access network.

OBJECT OF THE INVENTION

It is an object of the present invention to provide an improved or at least alternative method of installing subscriber terminals in a packet switched wireless access network.

SUMMARY OF THE INVENTION

In a first aspect the present invention provides a method for installing subscriber terminals in a packet switched wireless access network comprising a plurality of base stations, wherein the terminals network address is dependent on the base station to which said terminal is radio linked, said method comprising the steps of determining a unique identification reference and the installation site for said terminal ; pre-loading each of said base stations within the geographical area of said installation site with said reference and a network address for said terminal which is dependent on said base station; receiving a connect message including said reference from said terminal to one of said base stations; transmitting to said terminal the network address dependent on said receiving pre-loaded base station.

Preferably said one of said base stations is selected by performing a radio survey to determine the optimum radio link between said terminal and the base stations within said geographical area.

Preferably said network is an IP network and said network address is an IP address.

Preferably the pre-loading step comprises storing in a DHCP server in each said base station said reference and said network address.

Preferably comprising the step of transmitting to said terminal a sub-net mask and default router reference which are dependent on said selected base station.

Preferably said determining step comprises the supplier of said terminal forwarding said terminal identification reference and said geographical area to an operator of said network.

In a second aspect the present invention provides apparatus for installing subscribers in a packet switched wireless access network comprising a plurality of base stations, wherein the terminals network address is dependent on the base station to which said terminal is radio linked, said apparatus comprising: means for pre-loading each of said base stations within the geographical area of the installation site of said terminal with a unique identification reference for said terminal and a network address for said terminal which is dependent on the pre-loaded base station; means for receiving a connect message including said reference from said terminal to one of said pre-loaded base stations; means for transmitting to said terminal the network address dependent on said receiving pre-loaded base station.

Preferably said network is an IP network and said network address is an IP address.

Preferably said means for pre-loading comprises storing in a DHCP server in each said base station said reference and said net address dependent on said base station.

In a third aspect the present invention provides a self-installing subscriber terminal for use in a packet switched wireless access network comprising a plurality of base stations, wherein the terminals network address is dependent on the base station to which said terminal is radio linked, said terminal comprising means for transmitting a connect message including a unique identification reference for said terminal to one of said base stations; and means for receiving a network address dependent on said base station.

BRIEF DESCRIPTION OF THE DRAWINGS

In order to show how the invention may be carried into effect, embodiments of the invention are described below with reference to the accompanying drawings, by way of example only and without intending to be limiting, in which:

FIGS. 2(a)–(d) show example IP addresses in a typical sub-net arrangement for subscriber terminals and nodes installed according to the method of the invention.

DETAILED DESCRIPTION OF PREFERRED EMBODIMENTS

Figure 1:
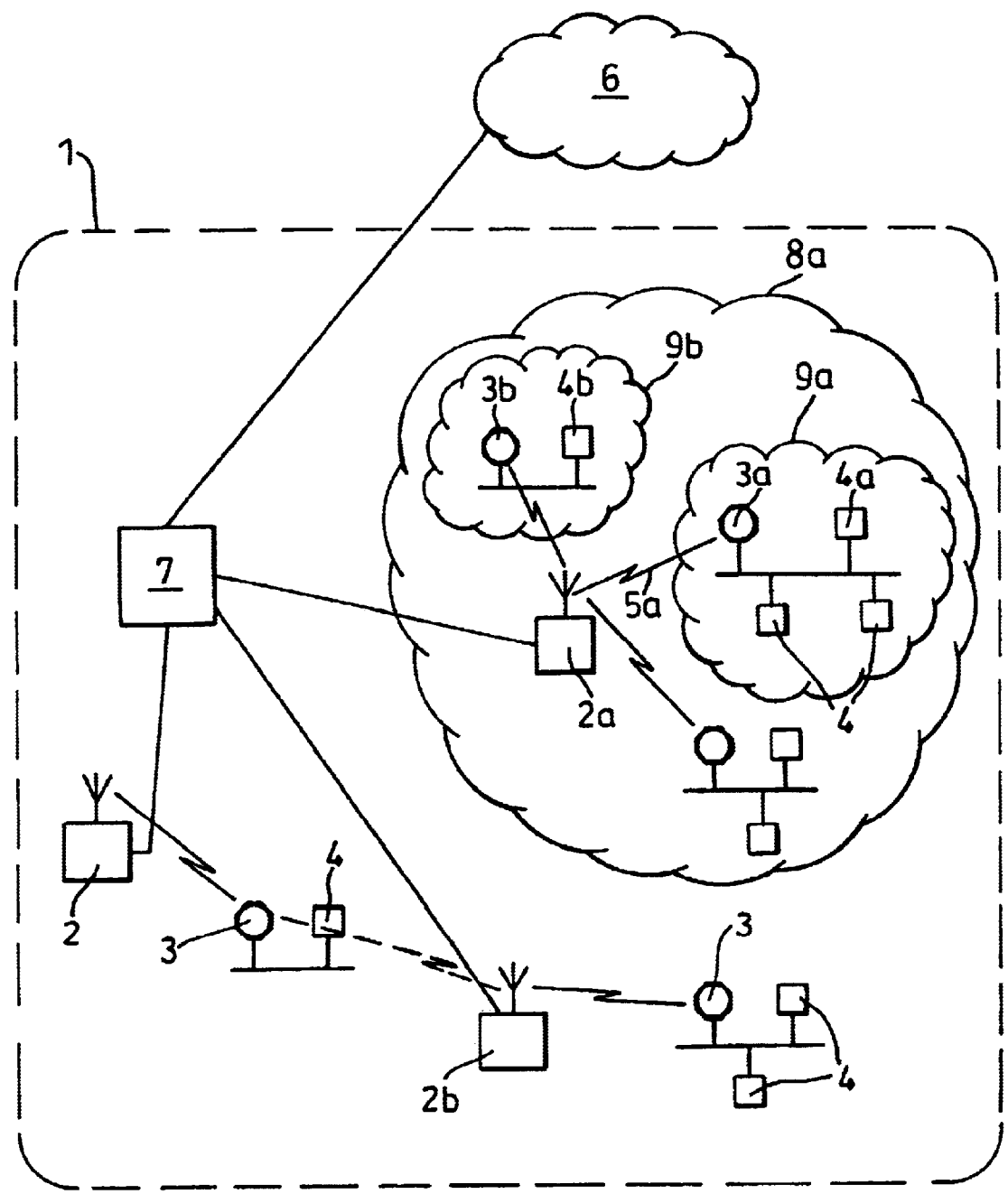
FIG. 1 is a schematic diagram of a packet switched wireless access network.

FIG. 1 shows an example of a typical packet switched wireless access network 1 which comprises; a plurality of base stations 2; a network switching centre 7 to which the base stations 2 are connected; and a plurality of subscriber terminals 3 to which are connected one or more subscriber nodes 4 (such as computers or digital phones) The wireless access network 1 is connected to the Internet 6 and allocates each subscriber node 4 a unique IP address. The base stations 2 are sited to give appropriate radio coverage and data capacity in a cellular network arrangement and each cell behaves essentially as a LAN and is designated as a sub-net or IP network 8. Similarly each subscriber's premises within the designated IP network 8 is allocated a sub-net 9 of this (cell) network.

Each subscriber terminal 3 is connected to a base station 2 using a radio link 5. Because the wireless access network 1 is arranged into sub-nets, the unique IP address of each subscriber terminal 3 and node 4 will be dependent on the particular base station 2 which the subscriber terminal 3 connects to.

Figure 2:
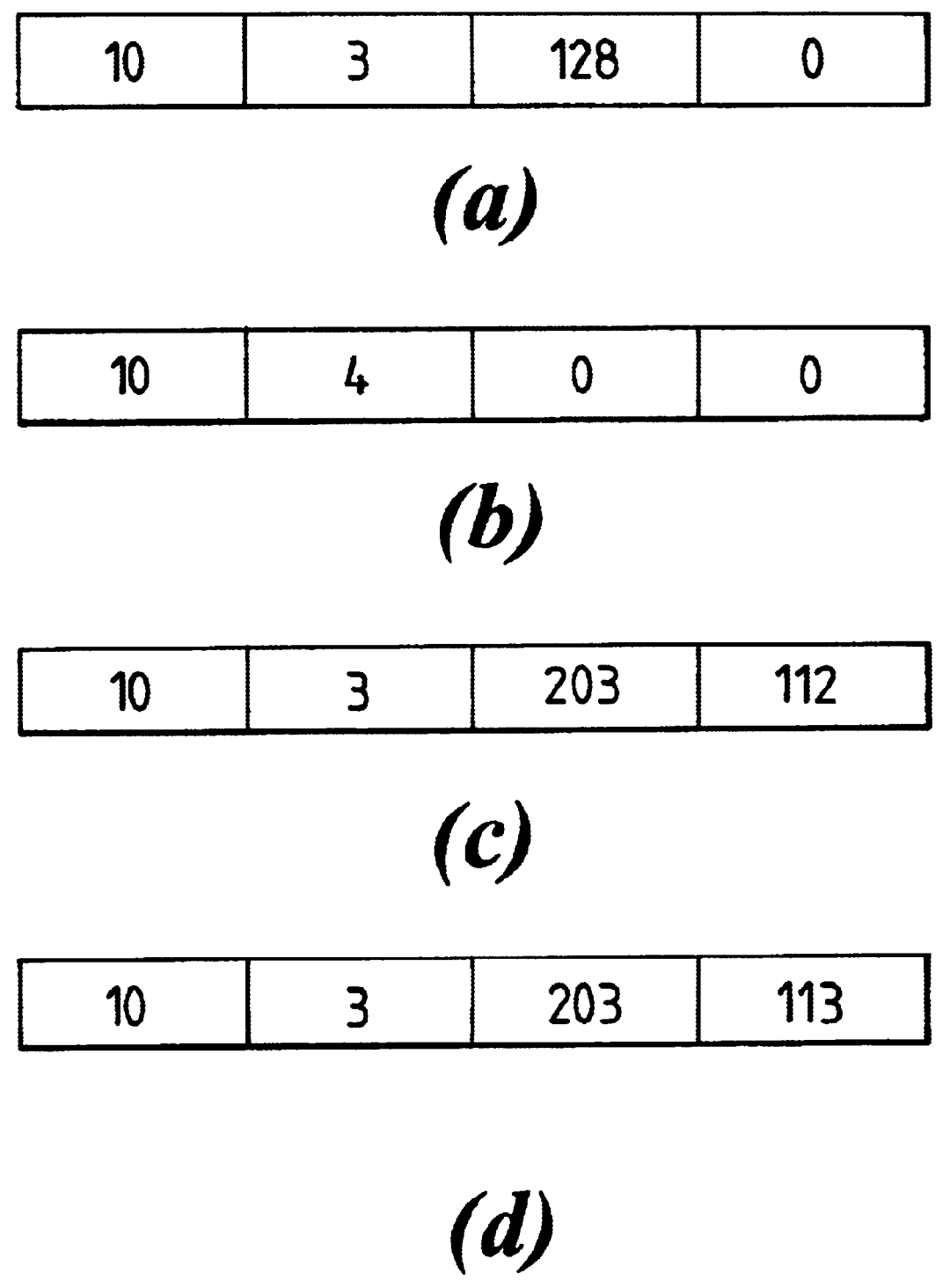

FIG. 2 illustrates how the sub-netting of the wireless access network 1 is typically arranged. FIG. 2(a) shows an example IP address for the basestation subnet 8a for base station 2a in FIG. 1. Similarly FIG. 2(b) shows an example IP address for the subnet 9b of basestation 2b. FIG. 2(c) shows an example IP address for the subscriber subnet 9a for terminal 3a in FIG. 1. It can be seen that the first two bytes of the address are the same, making the subscriber IP address dependent on the base station to which it is connected by radio link 5a. FIG. 2(d) shows the IP address of an IP node (4a in FIG. 1) such as a computer connected to the subscriber terminal 3a. This forms part of the subscriber subnet 9a and again it can be seen that this is dependent on the base station to which the terminal is connected.

A disadvantage of this arrangement within existing wireless access networks however, is that it is not possible to determine in advance of subscriber terminal installation which base station 2 will be connected to the subscriber terminal 3 as radio propagation in the vicinity of the subscriber premises is dependent upon a multitude of factors such as local topology, building clutter and interfering signals for example. The optimum radio link between a subscriber's premises and a base station 2 may therefore not be to the closest base station 2. Existing methods of installing subscriber terminals require a skilled technician to determine the subscriber terminal and nodes IP addresses after physical installation of the subscriber terminal and connection to the selected base station 2.

As described previously, in order to ensure rapid and low cost roll-out of a wireless access network, it is preferred that the subscriber install and configure all the necessary equipment himself. However in order to operate properly, appropriate IP networking parameters (IP address, sub-net mask, default router etc.) need to be entered into the subscriber's terminal 3 and connected nodes 4. The necessary information is not available to the supplier of the equipment at the time of sale as it depends on the actual base station to which the radio connection is eventually made. The base station 2 selected depends on radio propagation factors which can only be measured as part of the actual installation process.

The IP address assignment as well as other IP parameters is dependent upon the selected base station and must be error free in order for the subscriber terminal 3 and indeed the access network 1 to function properly. In practice it has not been possible to rely on subscribers' to self install these IP parameters by means of manually entering the allocated IP address for example.

Figure 3:
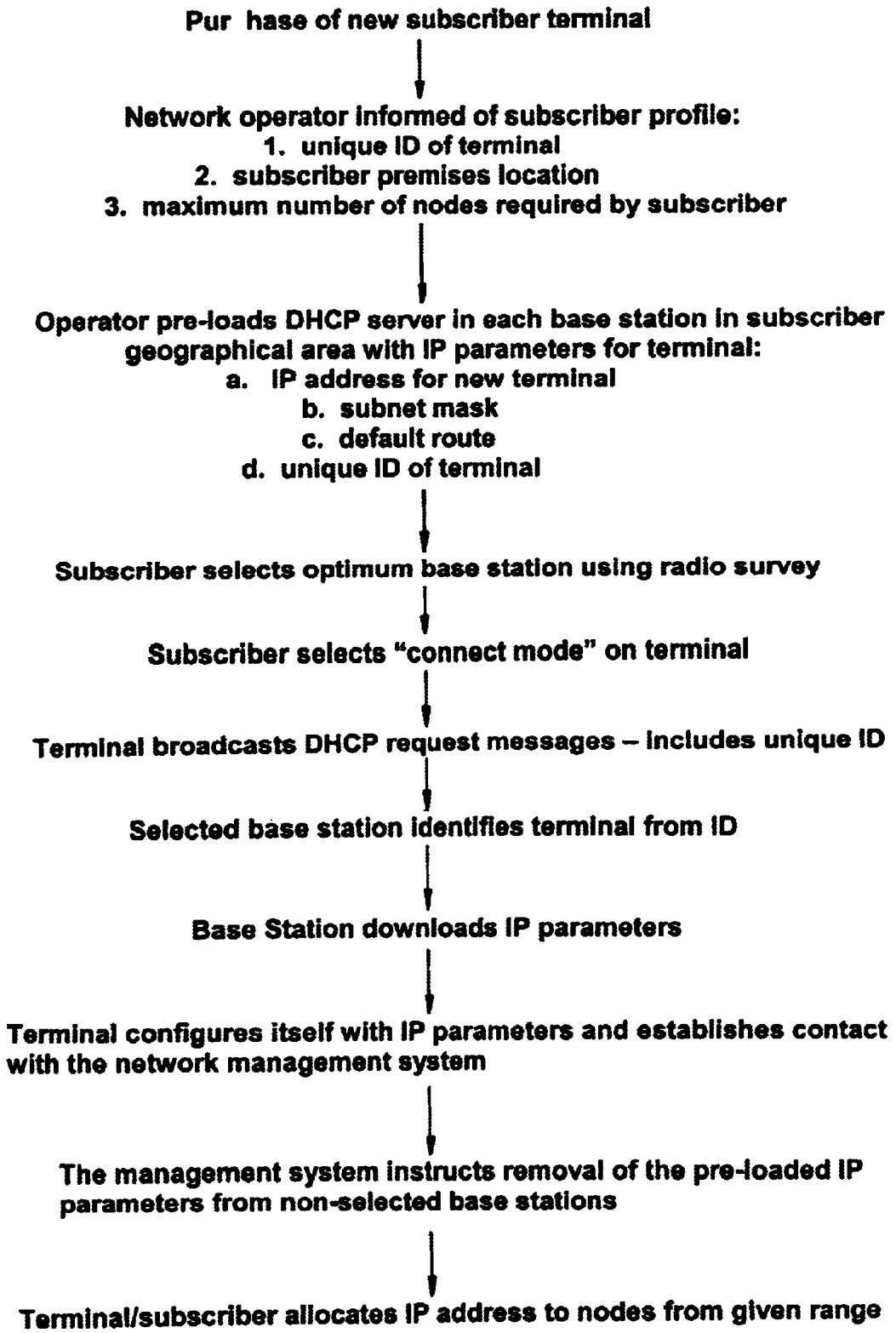
FIG. 3 is a flowchart showing a subscriber terminal self-installation method according to the present invention.

A preferred embodiment method of self-installation of subscriber terminals 3 within a packet switched wireless access network 1 is shown in FIG. 3. Each terminal 3 is allocated a unique identification number. On purchase of a subscriber terminal 3 by a subscriber, the network operator determines the subscriber's profile using information forwarded by the supplier of the terminal 3. The subscriber's profile includes information on: the terminal 3 unique identification number; the geographical area, for example post code, of the subscriber's premises where the terminal 3 will be installed; and the maximum number of nodes 4 (such as computers, digital phones, others?) required by the subscriber which will be connected to the terminal 3.

Each base station 2 includes a DHCP (Dynamic Host Configuration Protocol server) as described in RFC 2131, which will include IP configuration data for all subscriber terminals 3 which it serves. Following receipt of a new subscriber profile, the network operator pre-loads each base station within the geographical area of the subscriber's premises with IP parameters appropriate for that base station 2 and subscriber terminal 3. As note previously the subscriber terminal IP address will be different for each base station location 2. These IP parameters include: unique ID of the terminal, IP address; sub-net mask; and default router. Other parameters may also be included for example node name. While DHCP is preferred, any protocol which allows a server to dynamically assign IP addresses and other parameters to nodes may alternatively be used (for example BOOTP)

Following purchase of a subscriber terminal 3 the subscriber performs a simple radio survey, attaching the subscriber terminal to a suitable location on the subscriber's premises and then logically connecting to the data network. It is during this later part of the process that the IP parameters must be set. The installation process includes powering the terminal 3 in an "installation mode" and scanning in azimuth for the optimum base station 2 to which to connect. Terminal installation software includes algorithms to select the optimum base station 2 after analysis of the received radio signals. The optimum base station need not necessarily be the nearest base station. On completion of the survey process the terminal 3 is mounted securely pointing in the direction of the selected base station 2.

On completion of the survey and physical installation, a "connect mode" is selected on the subscriber terminal 3. Using an ALOHA type protocol or similar random access protocol the subscriber terminal 3 alerts the selected base station 2 that it requires IP parameters for configuring itself in the network sending a DHCP request message including the terminal's 3 unique identification code. The selected base station 2 receiving the message forwards it to the DHCP server which returns the relevant IP parameters for that subscriber terminal 3 based on the unique ID. As described above these depend on the base station 2 and include the IP address of the terminal 3, its sub-net mask, and default router etc. as specified. On completion of this exchange, the subscriber terminal 3 configures itself with the downloaded IP parameters and then contacts the networks management system (not shown) to complete logical connection to the network 1. The management system then instructs the DHCP entries for the terminal 3 in base station DHCP servers to which the terminal 3 did not connect to be removed such that they are subsequently available for reuse.

The IP address of the subscriber terminal 3 is statically assigned to support management of the terminal 3 through standard IP management protocol. However, it is possible to deactivate these settings should the subscriber relocate to a different geographical area. A similar process is employed with reinstallation of the terminal following a request from the subscriber to the network operator/service provider. Again, a number of base stations in the new geographical area have their DHCP servers pre-loaded with appropriate IP addresses and the actual base station 2 used (selected following a radio survey by the subscriber) is connected to the network using the same method of obtaining its IP parameters.

Allocation of IP addresses by the subscriber to its IP nodes 4 can be selected as either static or dynamic, within the sub-address range allocated when the terminal 3 was purchased. The selection could be, for example controlled by a standard web browser on the subscriber's system (terminal 3 and nodes 4 including a computer) and a web server at the base station 2. Any number of IP nodes within the permitted number can be connected and requests for IP addresses, static or dynamic are relayed by the subscriber terminal 3 to the base station DHCP server. The use of dynamic addresses allows reuse of addresses by different nodes 4, for example roving notebook computers between different subscriber's premises.

DHCP is included as a standard feature in many of the popular operating systems used by current computer systems, for example Windows and Linux. This further reduces the cost and ease of self-installation improving the marketability and roll-out costs of the wireless access network 1.

The present invention provides a feasible self-installation method for wireless access network subscriber terminals 3 for the consumer and SOHO (Small Office/Home Office) market which avoids the cost of installation personnel and allows rapid deployment of the network 1. Self-installation implies that the installers will usually be inexperienced and untrained. The invention reduces the complexity of the installation process and the probability of errors in the subsequent configuration helps to ensure that the network 1 will operate smoothly and additionally improves the acceptance of the product in the market place.

While the invention has been described with reference to IP addresses and the Internet, the invention may also be used in connection with any collection of packet switched data networks which includes a packet switched wireless access network 1, and any appropriate addressing protocols.

The foregoing describes the invention including preferred forms thereof. Alterations and modifications as would be obvious to someone skilled in the art are intended to be incorporated within the scope hereof.

What is claimed is:

1. A method for installing a subscriber terminal in a packet switched wireless access network comprising a plurality of base stations, wherein an IP network address for the terminal is dependent on an IP address of a base station to which the terminal is to be wirelessly linked, said method comprising the steps of:

allocating a unique identification reference to said terminal;

determining an installation site for said terminal;

for each of a number of base stations within a geographical area of said installation site, identifying to each such base station the terminal's unique identification reference and a unique IP network address for said terminal based on the IP address of such base station;

selecting which of said number of base stations said terminal is to be wirelessly linked with;

receiving at said selected base station a connect message from said terminal, said connect message including the terminal's unique identification reference; and in response to receipt of said connect message, transmitting from said selected base station to the terminal the unique IP network address for said terminal previously identified to said selected base station.

2. A method as claimed in claim 1 wherein said step of selecting a base station is conducted by performing a radio survey to determine an optimum radio link between said terminal and one of the number of base stations within said geographical area.

3. A method as claimed in claim 1 wherein the identifying step comprises storing in a DHCP server in each of said number of base stations said reference and the unique IP network address dependent on, the IP address of the base station.

4. A method as claimed in claim 3 further comprising the step of transmitting to said terminal a sub-net mask and default router reference which are dependent on said selected base station.

5. A method as claimed in claim 4 wherein said determining step comprises the supplier of said terminal forwarding said terminal identification reference and said geographical area to an operator of said network.

6. Apparatus for installing a subscriber terminal in a packet switched wireless access network comprising a plurality of base stations, wherein an IP network address for the terminal is dependent on an IP address of a base station to which said terminal is to be wirelessly linked, said apparatus, comprising:

means for identifying to each of a number of base stations within a geographical area of an installation site of said terminal a unique identification reference for said terminal and a unique IP network address for said terminal which is dependent on the of such base station;

means for selecting which of the number of base stations that the terminal is to be wirelessly linked with;

means for receiving at said selected base station a connect message from said terminal, said connect message including said reference for said terminal; and means for transmitting from said selected base station to said terminal the unique IP network address for said terminal previously identified to said selected base station.

7. A method of allocating an IP address to a subscriber terminal having a unique identification reference in a packet switched wireless access network comprising a plurality of base stations, wherein the IP address for the terminal is dependent on the IP address of a base station to which the terminal is to be wirelessly linked, the method comprising the steps of:

determining a location of the subscriber terminal;

identifying to each of a number of base stations in a vicinity of the location of the terminal the terminal's unique identification reference and a unique IP address for the terminal based on the IP address of such base station;

selecting which of said number of base stations said terminal is to be wirelessly linked with;

receiving at said selected base station a connect message from said terminal, said connect message including the terminal's unique identification reference; and in response to receipt of said connect message, transmitting from said selected base station to the terminal the unique IP network address for said terminal previously identified to said selected base station.

* * * * *